United States Patent [19]
Hashimoto

[11] 3,951,522
[45] Apr. 20, 1976

[54] LENS STRUCTURE HAVING A MOVABLE PORTION

[75] Inventor: Shigeru Hashimoto, Yokohama, Japan

[73] Assignee: Canon Kabushiki Kaisha, Tokyo, Japan

[22] Filed: Dec. 5, 1974

[21] Appl. No.: 529,966

Related U.S. Application Data

[63] Continuation of Ser. No. 355,597, April 30, 1973, abandoned.

[30] Foreign Application Priority Data

May 15, 1972   Japan............................ 47-56485[U]

[52] U.S. Cl. ............................ 350/187; 350/276 SL
[51] Int. Cl.² ......................................... G02B 15/14
[58] Field of Search ............... 350/276 SL, 187, 199

[56] References Cited
UNITED STATES PATENTS

| | | |
|---|---|---|
| 2,670,656 | 3/1954 | Braymer .............................. 350/199 |
| 2,902,901 | 9/1959 | Back .................................. 350/187 |

*Primary Examiner*—Paul A. Sacher
*Attorney, Agent, or Firm*—William R. Woodward

[57] ABSTRACT

In a lens structure having a movable portion, a pair of movable lenses and holder frames therefor are slidably fitted together within a guide cylinder, and a stationary cylindrical light shield is provided to cover the surface of the guide cylinder along which the lens holder frames are slidable. The frames each have a pair of radial connecting spokes extending through slots in the light shield, to connect the support of the movable lenses to the sliding member guided by the guide cylinder, so that the light shield extends to beyond the rearmost position of the forward movable lens and undesired reflection at the sliding surfaces of the movable lens frame and of the guide cylinder is prevented.

1 Claim, 5 Drawing Figures

LENS STRUCTURE HAVING A MOVABLE PORTION

This is a continuation, of application Ser. No. 355,597, filed Apr. 30, 1973 and now abandoned.

BACKGROUND OF THE INVENTION

1. Field of the Invention

This invention relates to a lens structure, particularly for use as a zoom lens, having movable lens frames within a lens barrel and which is so constructed as to prevent any deleterious reflection of light from occurring on that surface of a guide portion with respect to which the movable lens frames are slidable.

2. Description of the Prior Art

Photographic zoom lenses have generally been constructed so that a pair of movable lens groups is disposed and movable axially between a forward lens adapted to be moved only during focusing and a rearward stationary lens, thereby varying the relative position of the movable lenses and accordingly varying the focal length. In lenses of such construction, however, the inner surface of a guide cylinder within which the frames for the pair of movable lens groups are fitted must be provided with a smooth surface finish so as to permit smooth sliding movement of the frames, and this has been incompatible with the desire to provide an anti-reflection treatment such as a light-intercepting coating or similar streaks on the surface of the guide cylinder.

In a zoom lens of long focal length or great zoom ratio which inherently has a wider range of the movement of the zooming lens, particularly when the first zooming lens is at the rearmost position thereof, the light which has passed through the focusing lens and thereafter reflected by the smooth inner surface of the guide cylinder would give rise to serious damage to the image formation.

One known solution for this problem, which will be described in detail hereinafter in conjunction with the accompanying drawings, is to provide partial sliding portions between the lens frame and the inner surface of the guide cylinder, thereby permitting anti-reflection treatment on the other inner surface of the cylinder other than said sliding portions. However, such a construction could not completely eliminate the above described unpreferable reflections, because of the sliding surfaces which are not subject to the anti-reflection treatment.

SUMMARY OF THE INVENTION

It is an object of the present invention to overcome the above-noted disadvantages by providing a cylindrical light shielding member extending over the inner surface of the guide cylinder.

According to the present invention, a lens structure having a movable portion comprises at least one movable lens, a lens frame for the movable lens slidably fitted within a guide cylinder, and a stationary cylindrical shielding member covering the surface of the guide cylinder having slots through which radial portions of the lens frame pass and along which the radial portions are axially slidable. Thus the movable lens frame movable without interfering with the shielding member which can extend to the rearmost position of the movable lens. This construction substantially eliminates any possible reflected light which would result from the inner surface of the guide cylinder.

If there are two or more movable lenses, at least the front one should have a supporting frame movable through slots in the light shield.

BRIEF DESCRIPTION OF THE DRAWINGS

The above object and other features of the present invention will become fully apparent from the following detailed description taken in conjunction with the accompanying drawings in which.

DESCRIPTION OF THE PREFERRED EMBODIMENTS

Figure 4:
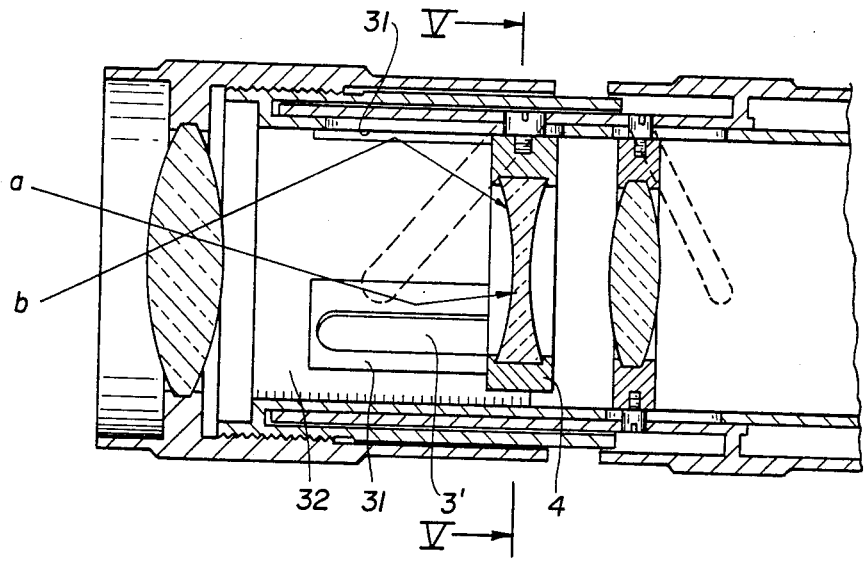
FIG. 4 is a longitudinal section of a presently conventional lens structure.
Figure 5:
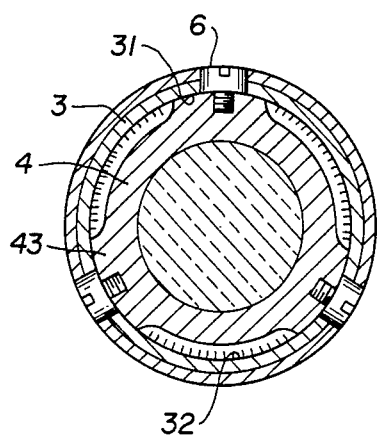
FIG. 5 is a cross-section along the line V—V of FIG. 4.

Referring first to FIGS. 4 and 5, which show a conventional zoom lens structure provided with an anti-reflection surface on a guide cylinder 3, the frame 4 for supporting a zooming lens is not in contact with the whole inner circumferential surface of the guide cylinder, but is in contact with the inner surface only at projections 43 integrally formed on the frame 4. The inner surface of the guide cylinder 3, therefore, is finished only at sliding surfaces 31, while the other surface 32 can be subject to anti-reflection treatment, such as flocking. Such a lens structure is usually so mounted to the camera that the anti-reflection surface is disposed downwardly, so as to avoid the reflection of an intense light coming from the sky. However, even such a location is not effective to eliminate the undesired reflection of light which comes in obliquely.

Figure 1:
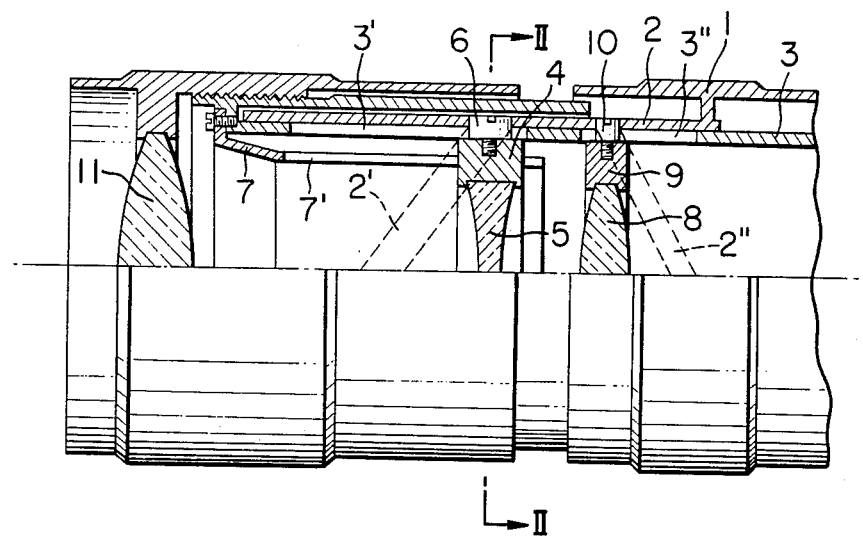
FIG. 1 is a longitudinal sectional view showing the essential portion of the lens structure according to an embodiment of the present invention.
Figure 2:
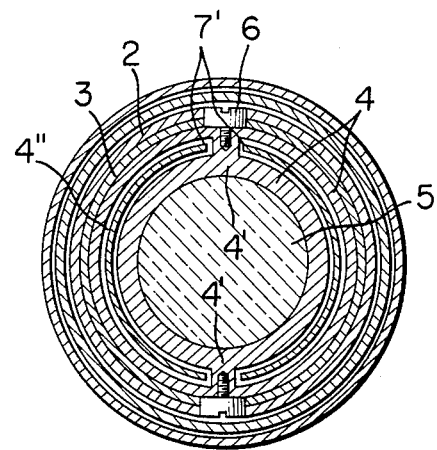
FIG. 2 is a transverse section taken along line II—II in FIG. 1.

Referring now to FIGS. 1 and 2 which show a preferred embodiment of the present invention, numeral 1 designates a zoom operating ring, and a cam cylinder 2 provided with camming grooves 2' and 2'' is integrally connected to the operating ring 1 and rotatably fitted over a fixed guide cylinder 3. A lens frame 4 holds a movable lens 5 therewithin and is slidably fitted within the guide cylinder 3. The lens frame 4 has a guide pin 6 studded in the outer peripheral surface thereof, which pin is received in the camming groove 2' of the cam cylinder and in a straight groove 3' formed in the guide cylinder 3. The guide cylinder 3 is mounted in stationary position in the lens tube (not shonw), so that the movement of the guide pin 6 is restricted to the axial movement, in other words, the frame 4 does not rotate. The rotation of the zooming ring 1, therefore, moves the frame 4 along the axis of the cylinder by means of the cam groove 2'. Such a construction is well known.

Another movable lens 8 is disposed rearwardly of the movable lens 5 and held by a lens frame 9. The movable lens 8 may be guided by a pin 10 studded in the frame 9 and received in the camming groove 2'' and in a straight groove 3'' formed in the guide cylinder 3, whereby the lens frame 9 with the lens 8 is rectilinearly movable through the guide cylinder in response to operation of the operating ring 1.

A cylindrical light shield member 7 is secured to the guide cylinder 3 by screws or other suitable means, and has its inner peripheral surface pre-treated for anti-reflection. Such anti-reflection treatment may be done by any one of the known method, e.g. by forming said inner peripheral surface with a number of alternate concave and convex streaks known as light-intercepting streaks and applying an anti-reflection coating material to such streaked surface, or by attaching a sheet of rough-surfaced black paper or such like velvet to said inner peripheral surface, or by flocking.

Figure 3:
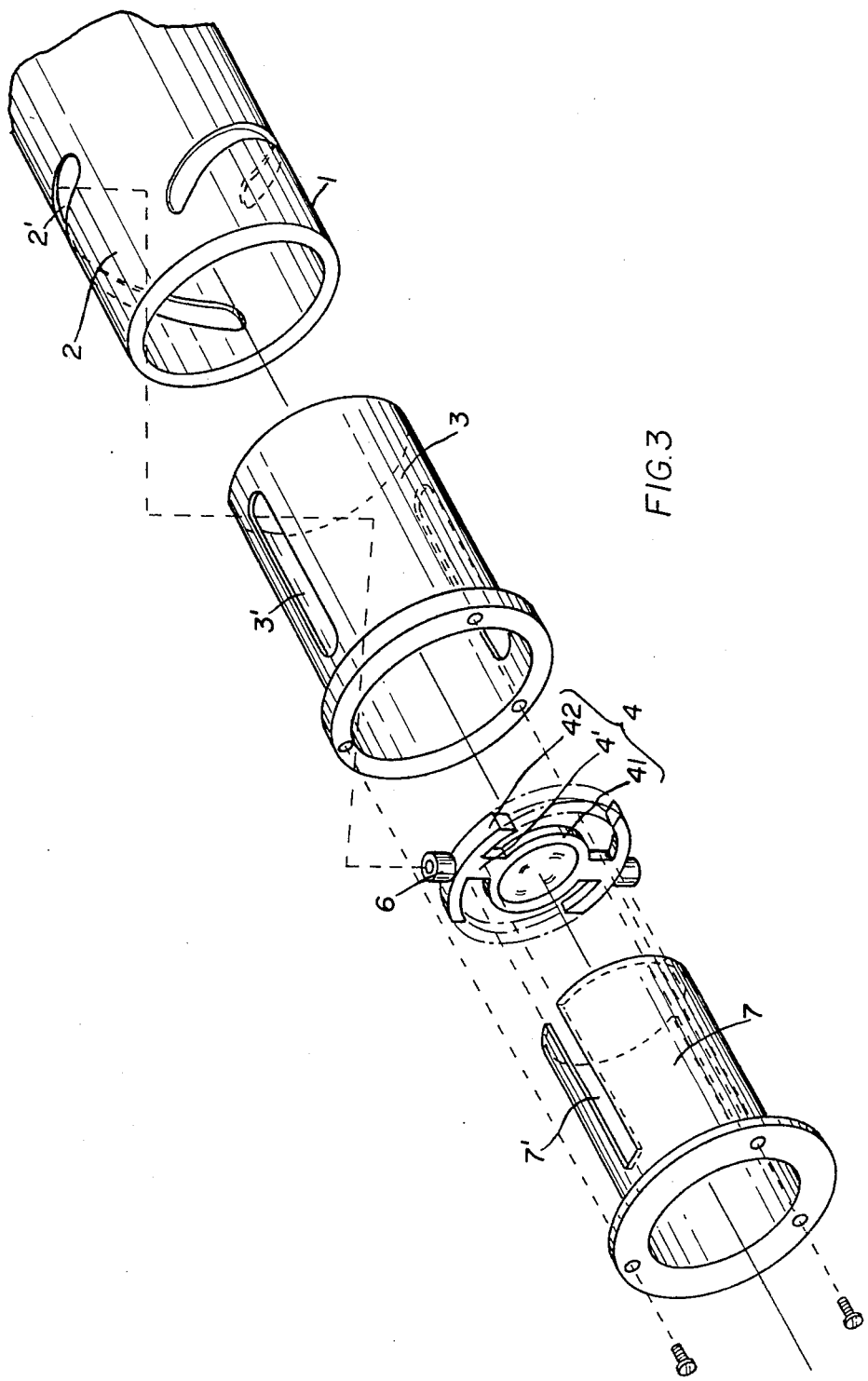
FIG. 3 is an exploded perspective view of part of the lens structure shown in FIGS. 1 and 2.

FIG. 3 shows part of the lens structure of FIGS. 1 and 2 exploded longitudinally, showing the frame 4 but not the frame 9. The frame 4 of the movable lens 5 includes a lens frame portion 41, a full or partial annular sliding portion 42 and a connecting portion 4' between the frame and the sliding portion, all these portions being formed integrally. The light shield member 7 has a slot 7' formed therein to permit the axial movement of the frame 4, as described below. The shield member 7 is secured to a stationary member, in this case the guide cylinder 3, so that the slot 7' of the shield member 7 receives the connecting portion 4' of the frame 4, with the shield member 7 being interposed between the frame portion 41 and the sliding portion 42 of the frame. The shield member 7, thus permits the axial movement of the frame 4, while providing a cover for the inner surface of the guide cylinder over the whole range of the movement of the movable lens frame 4.

With the described construction, light rays entering through a forward lens 11 may be intercepted by the light shield member 7 without reaching the surface of the guide cylinder 3, with respect to which the movable lens frames are slidable, and moreover, the light shield member is treated for anti-reflection as described, so that no deleterious reflected light can reach a sensitive film surface, not shown.

The escape grooves 7' formed in the shield member 7 are narrow in width so that any light which might happen to pass through such grooves can be reflected by the sliding surfaces of the guide cylinder is negligibly small and imparts no adverse effect on an image formed by the lens. Thus, the image formed will be far superior to the kind produced by the conventional construction.

According to the present invention, described above, a stationary light shield member is provided to cover the sliding surface of the guide cylinder and in addition, the movable lens frames are slidably fitted within the guide cylinder substantially over their entire peripheral surfaces. This ensures positive fitting of the movable lens frames and prevents any eccentricity or tilting of the movable lenses, thus effectively preventing any deleterious reflected light without spoiling the optical performance or operability of the lens structure.

I claim:

1. A zoom lens structure for a camera, whether a still camera or a motion picture camera, comprising:

at least one movable lens for zooming;

a guide cylinder for the movement of said lens;

a lens frame movable within said cylinder along the optical axis of said lens and having a portion for supporting said lens, a portion for slidable engagement with said cylinder and radial portions for connecting said supporting portion and engaging portion to form arcuate slots between the supporting portion and the engaging portion; and a cylindrical light shield member provided with an inner cover antireflection surface over the whole range of the movement of said frame and having longitudinally extending slots, the radial portions of said lens frame passing through the longitudinally extending slots of said light shield member, and said shield member passing through said arcuate slots, thereby permitting passing through said arcuate slots, thereby permitting movement of said frame without any interference between said frame and said shield member.

* * * * *

UNITED STATES PATENT AND TRADEMARK OFFICE
CERTIFICATE OF CORRECTION

PATENT NO. : 3951522
DATED : April 20, 1976
INVENTOR(S) : Shigeru HASHIMOTO

It is certified that error appears in the above-identified patent and that said Letters Patent are hereby corrected as shown below:

In column 4, lines 35 and 36, (claim 1), delete the surplus words "thereby permitting passing through said arcuate slots".

Signed and Sealed this

Fourteenth Day of September 1976

[SEAL]

Attest:

RUTH C. MASON
*Attesting Officer*

C. MARSHALL DANN
*Commissioner of Patents and Trademarks*